US012360473B2

(12) United States Patent
Nakai

(10) Patent No.: US 12,360,473 B2
(45) Date of Patent: Jul. 15, 2025

(54) IMAGE FORMING APPARATUS

(71) Applicant: KYOCERA Document Solutions Inc., Osaka (JP)

(72) Inventor: Kazuki Nakai, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 18/785,982

(22) Filed: Jul. 26, 2024

(65) Prior Publication Data

US 2025/0044718 A1 Feb. 6, 2025

(30) Foreign Application Priority Data

Aug. 3, 2023 (JP) ................................ 2023-127306

(51) Int. Cl.

*G03G 15/02* (2006.01)
*G03G 15/00* (2006.01)
*G03G 21/00* (2006.01)

(52) U.S. Cl.

CPC ..... *G03G 15/0266* (2013.01); *G03G 15/5008* (2013.01); *G03G 15/5037* (2013.01); *G03G 21/0058* (2013.01); *G03G 2215/1652* (2013.01); *G03G 2221/1627* (2013.01)

(58) Field of Classification Search

CPC .......... G03G 15/0266; G03G 15/5008; G03G 15/5037; G03G 21/0058; G03G 2215/1652; G03G 2221/1627

See application file for complete search history.

(56) References Cited

U.S. PATENT DOCUMENTS

2007/0230992 A1* 10/2007 Takayanagi .......... G03G 15/161 399/101
2017/0031315 A1* 2/2017 Suzuki ................. G03G 21/203
2023/0384715 A1* 11/2023 Song .................. G03G 15/1675

FOREIGN PATENT DOCUMENTS

JP 2005-331875 A 12/2005

* cited by examiner

*Primary Examiner* — Joseph S Wong
(74) *Attorney, Agent, or Firm* — Stein IP, LLC

(57) ABSTRACT

The control unit of an image forming apparatus applies, with a voltage application unit, a collection voltage to a cleaning roller when an image is formed, estimates a surface potential of an image carrying member based on a current flowing between the image carrying member and the cleaning roller which is detected by a current detection unit when the collection voltage is applied and changes the collection voltage and the rotation speed of the cleaning roller when the surface potential of the image carrying member is lowered.

5 Claims, 6 Drawing Sheets

IMAGE FORMING APPARATUS

INCORPORATION BY REFERENCE

This application is based upon and claims the benefit of priority from the corresponding Japanese Patent Application No. 2023-127306 (filed on Aug. 3, 2023), the entire contents of which are incorporated herein by reference.

BACKGROUND

The present disclosure relates to image forming apparatuses.

As an image forming apparatus of an electrophotographic system such as a copying machine or a printer, an apparatus is widely used in which a toner is supplied to an electrostatic latent image formed on the outer circumferential surface of a photosensitive drum serving as an image carrying member and is developed, and thus a toner image to be thereafter transferred to a sheet is formed. In the image forming apparatus as described above, a transfer residual toner that is not transferred from the photosensitive drum to a member such as an intermediate transfer belt or the sheet to which the toner is to be transferred and is left on the photosensitive drum needs to be collected such that the transfer residual toner does not affect the subsequent image formation.

SUMMARY

An image forming apparatus according to an aspect of the present disclosure includes an image carrying member, a charging unit, an exposure unit, a development unit, a transfer unit, a cleaning roller, a voltage application unit, a current detection unit and a control unit. In the image carrying member, a photosensitive layer is formed on an outer circumferential surface. The charging unit charges the outer circumferential surface of the image carrying member to a predetermined surface potential. The exposure unit exposes the outer circumferential surface of the image carrying member charged by the charging unit to form an electrostatic latent image with attenuated charging. The development unit supplies a toner to the electrostatic latent image of the image carrying member to form a toner image. The transfer unit transfers the toner image formed on the outer circumferential surface of the image carrying member to a member to which the toner image is to be transferred. The cleaning roller removes and collects a substance adhered to the outer circumferential surface of the image carrying member. The voltage application unit applies a predetermined voltage to each of the charging unit, the development unit, the transfer unit and the cleaning roller. The current detection unit detects a current flowing between the image carrying member and the cleaning roller when the voltage application unit applies a collection voltage to the cleaning roller. The control unit controls the image carrying member, the charging unit, the development unit, the transfer unit, the cleaning roller and the voltage application unit. The control unit applies, with the voltage application unit, the collection voltage to the cleaning roller when an image is formed, estimates a surface potential of the image carrying member based on the current detected by the current detection unit when the collection voltage is applied and changes the collection voltage and a rotation speed of the cleaning roller when the surface potential of the image carrying member is lowered.

DETAILED DESCRIPTION

An embodiment of the present disclosure will be described below with reference to drawings. The present disclosure is not limited to details which will be described below.

Figure 1:
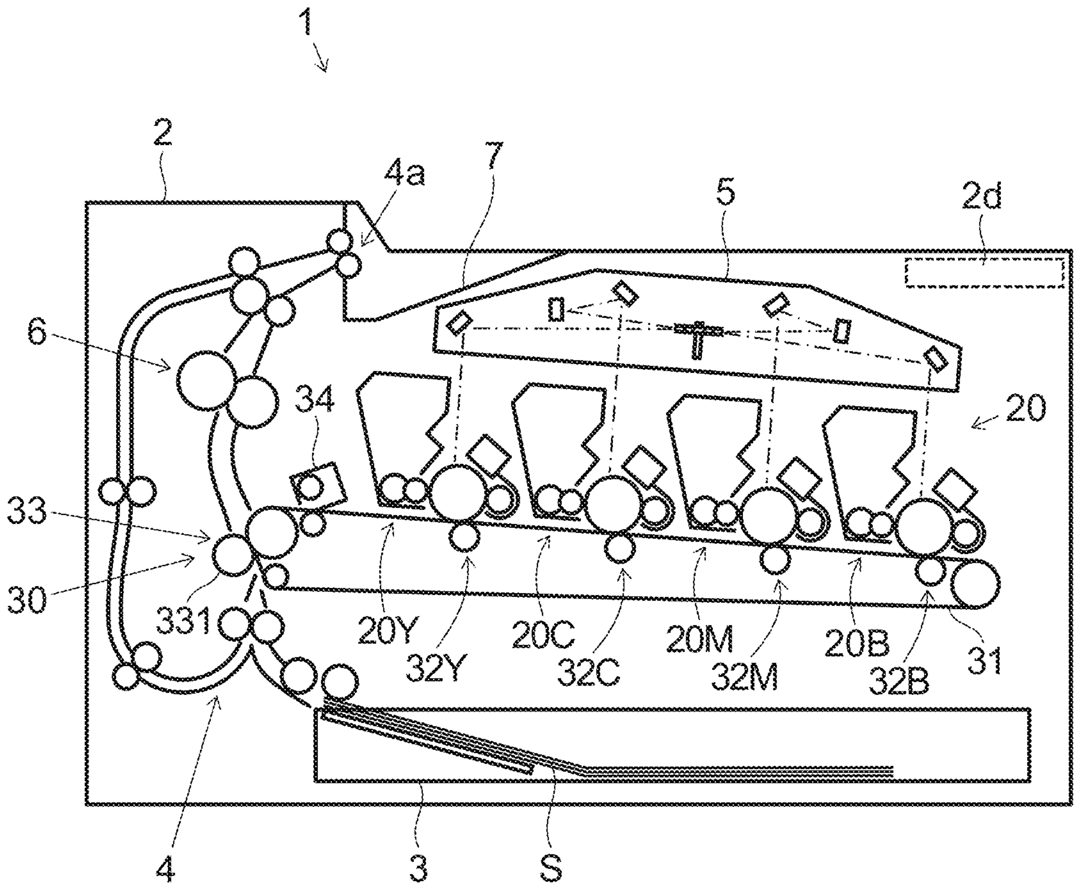
FIG. 1 is a schematic cross-sectional front view of an image forming apparatus according to an embodiment of the present disclosure.
Figure 2:
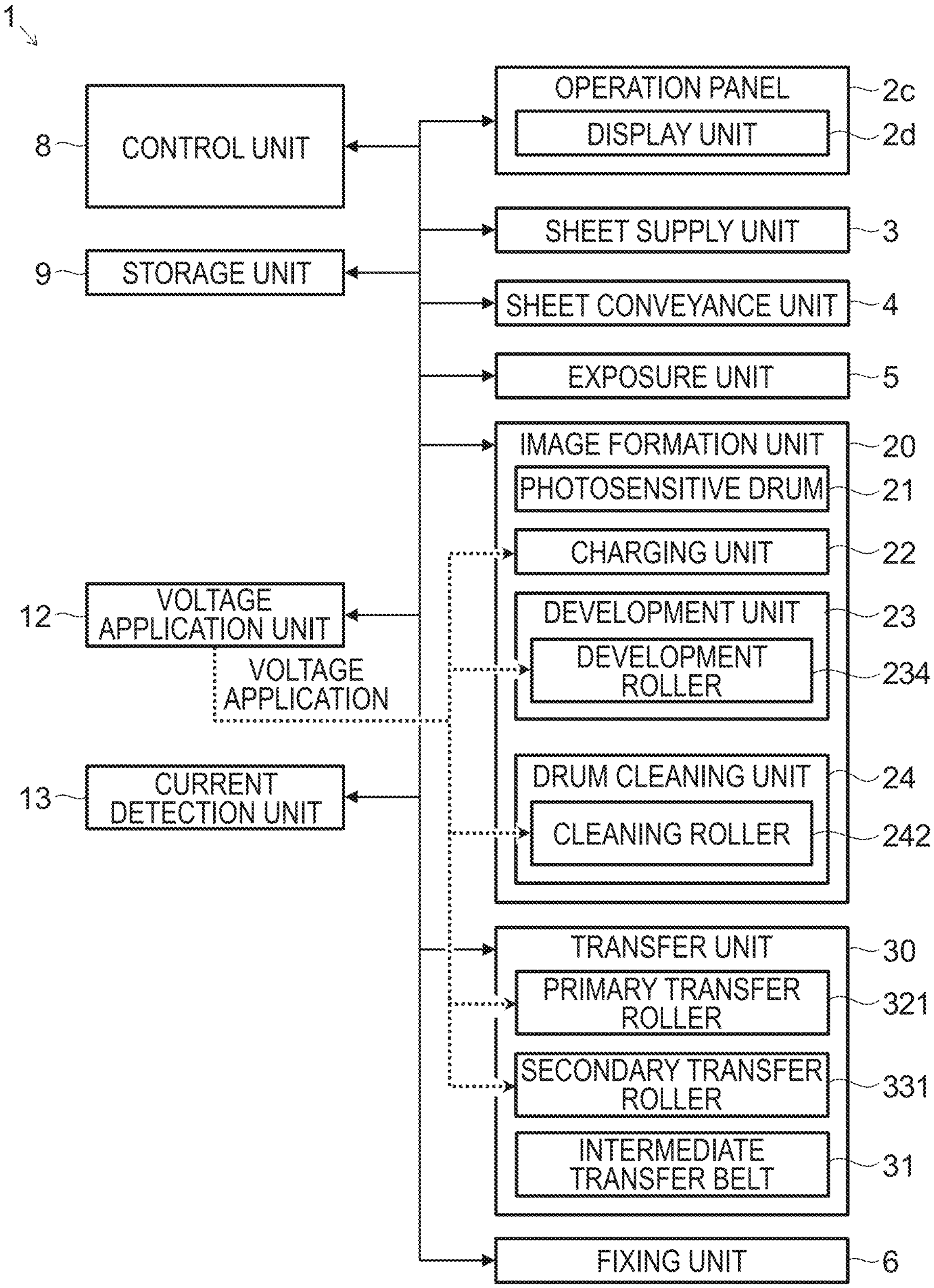
FIG. 2 is a block diagram showing the configuration of the image forming apparatus in FIG. 1.
Figure 3:
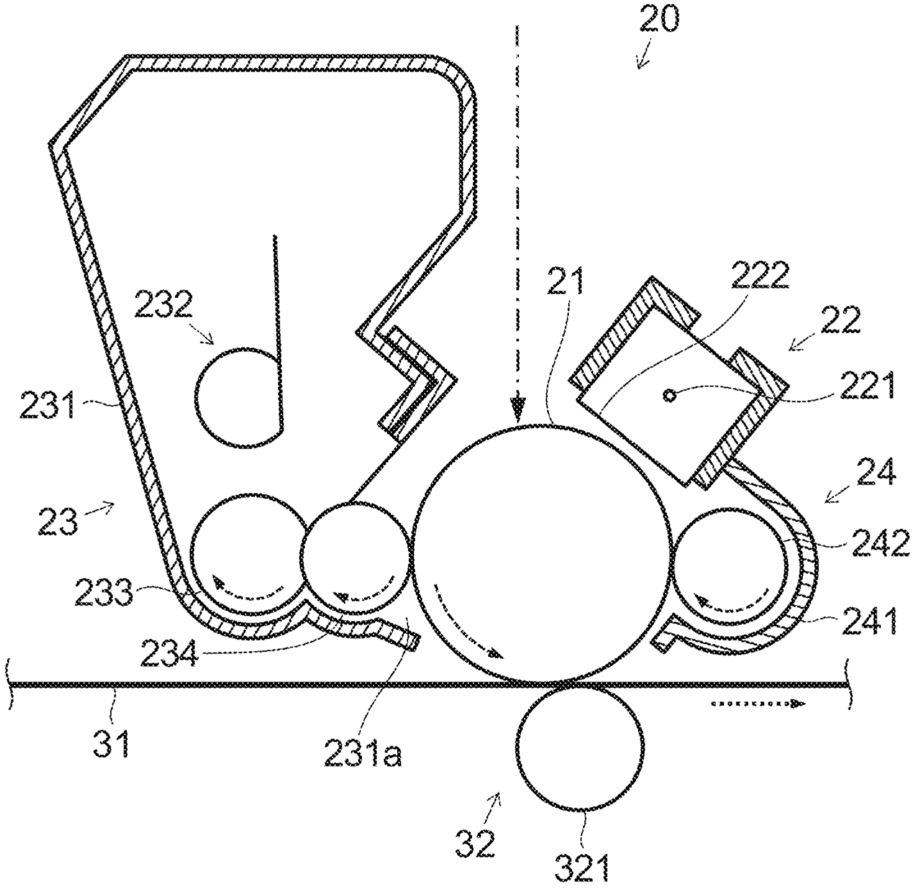
FIG. 3 is a schematic cross-sectional front view of an area around an image formation unit in the image forming apparatus of FIG. 1.

FIG. 1 is a schematic cross-sectional front view of an image forming apparatus 1 according to the embodiment. FIG. 2 is a block diagram showing the configuration of the image forming apparatus 1 in FIG. 1. FIG. 3 is a schematic cross-sectional front view of an area around an image formation unit 20 in the image forming apparatus 1 of FIG. 1. An example of the image forming apparatus 1 of the present embodiment is a color printer of a tandem system which receives image data and a print command related to a print job from an external computer, and uses an intermediate transfer belt 31 to transfer a toner image to a sheet S. The image forming apparatus 1 may be, for example, a so-called multi-functional peripheral which has the functions of printing, scanning (image reading), facsimile transmission and the like.

The image forming apparatus 1 includes, as shown in FIGS. 1 to 3, a sheet supply unit 3, a sheet conveyance unit 4, an exposure unit 5, the image formation unit 20, a transfer unit 30, a fixing unit 6, a sheet ejection unit 7, a control unit 8 and a storage unit 9 which are provided in the main body 2 thereof.

The main body 2 includes an operation panel 2*c*. For example, the operation panel 2*c* is arranged in an upper portion of the front surface of the main body 2, and includes a display unit 2*d* such as a liquid crystal display. For example, the operation panel 2*c* displays, on the display unit 2*d*, the image of a screen related to the type and size of the sheet S used for printing, settings of print conditions such as scaling, single-sided printing, double-sided printing and consolidated printing and the like and inputs such as a performance command, and directly receives inputs thereof from a user. Furthermore, the display unit 2*d* functions as a notification unit which displays the state of the image forming apparatus 1, notes, error messages and the like to notify them to the user.

The sheet supply unit 3 is arranged in a bottom portion of the main body 2. The sheet supply unit 3 stores a plurality of sheets S before printing, and feeds out the sheets S one by one during printing. The sheet conveyance unit 4 extends along a side wall of the main body 2 in an up/down direction. The sheet conveyance unit 4 conveys the sheet S fed out from the sheet supply unit 3 to a secondary transfer unit 33 and the fixing unit 6, and further ejects the sheet S after fixing from a sheet ejection port 4*a* to the sheet ejection unit 7. The exposure unit 5 is arranged in an upper portion of the main body 2. The exposure unit 5 applies laser light controlled based on image data toward the image formation unit 20.

The image formation unit 20 is arranged below the exposure unit 5 and above the intermediate transfer belt 31. The image formation unit 20 includes an image formation unit 20Y for yellow, an image formation unit 20C for cyan, an image formation unit 20M for magenta and an image formation unit 20B for black. These four image formation units 20 basically have the same configuration. Hence, in the following description, unless otherwise it is necessary to provide a particular limitation, identification symbols of "Y", "C", "M" and "B" which represent the individual colors may be omitted.

The image formation unit 20 includes a photosensitive drum (image carrying member) 21 which is supported to be able to rotate in a predetermined direction (counterclockwise in FIGS. 1 and 3). The image formation unit 20 further includes, around the photosensitive drum 21, a charging unit 22 which is arranged along the direction of the rotation, a development unit 23 and a drum cleaning unit (cleaning unit) 24. A primary transfer unit 32 is arranged between the development unit 23 and the drum cleaning unit 24.

A photosensitive layer is formed on the outer circumferential surface of the photosensitive drum 21. The charging unit 22 charges the outer circumferential surface of the photosensitive drum 21 to a predetermined surface potential. The exposure unit 5 exposes the outer circumferential surface of the photosensitive drum 21 charged by the charging unit 22 to form an electrostatic latent image of an original document image with attenuated charging on the outer circumferential surface of the photosensitive drum 21. The development unit 23 supplies a toner to the electrostatic latent image on the outer circumferential surface of the photosensitive drum 21 and develops the electrostatic latent image, and thereby forms a toner image. The four image formation units 20 form toner images of different colors.

The drum cleaning unit 24 removes and collects a substance adhered (transfer residual toner) such as a toner which is left on the outer circumferential surface of the photosensitive drum 21 after the toner image is primarily transferred to the outer circumferential surface of the intermediate transfer belt 31. The toner which is not collected by the drum cleaning unit 24 to be left on the outer circumferential surface of the photosensitive drum 21 is passed through the part of the charging unit 22 and is thereafter collected by the development unit 23. In this way, the image formation unit 20 forms an image (toner image) which is thereafter transferred to the sheet S.

The transfer unit 30 includes the intermediate transfer belt (member to which the toner image is to be transferred) 31, primary transfer units 32Y, 32C, 32M and 32B, the secondary transfer unit 33 and a belt cleaning unit 34. The intermediate transfer belt 31 is arranged below the four image formation units 20 and above the sheet supply unit 3. The intermediate transfer belt 31 is arranged opposite the four photosensitive drums 21. The intermediate transfer belt 31 is a seamless intermediate transfer member (member to which the toner image is to be transferred) which is supported to be able to rotate in a predetermined direction (clockwise in FIG. 1) and to which the toner images formed by the four image formation units 20 are sequentially primarily transferred. The four image formation units 20 are arranged in the so-called tandem system in which the image formation units 20 are linearly aligned from the upstream side of the intermediate transfer belt 31 in the direction of the rotation to the downstream side.

The primary transfer units 32Y, 32C, 32M and 32B are arranged below the image formation units 20Y, 20C, 20M and 20B of the individual colors through the intermediate transfer belt 31. The secondary transfer unit 33 is arranged on the upstream side of the fixing unit 6 in the sheet conveyance direction of the sheet conveyance unit 4 and on the downstream side of the four image formation units 20Y, 20C, 20M and 20B in the direction of rotation of the intermediate transfer belt 31. The belt cleaning unit 34 is arranged on the downstream side of the secondary transfer unit 33 in the direction of rotation of the intermediate transfer belt 31.

The primary transfer unit 32 transfers the toner image formed on the outer circumferential surface of the photosensitive drum 21 to the outer circumferential surface of the intermediate transfer belt 31. In other words, the toner images are primarily transferred to the outer circumferential surface of the intermediate transfer belt 31 by the primary transfer units 32Y, 32C, 32M and 32B of the individual colors. Then, the toner images of the four image formation units 20 are continuously transferred to the intermediate transfer belt 31 to be superimposed on each other together with the rotation of the intermediate transfer belt 31 with predetermined timing, and thus a color toner image in which the toner images of the four colors of yellow, cyan, magenta and black are superimposed on each other is formed on the outer circumferential surface of the intermediate transfer belt 31.

The color toner image on the outer circumferential surface of the intermediate transfer belt 31 is transferred to the sheet S synchronously fed by the sheet conveyance unit 4 in a secondary transfer nip portion formed in the secondary transfer unit 33. The belt cleaning unit 34 performs cleaning by removing a substance adhered such as the toner which is left on the outer circumferential surface of the intermediate transfer belt 31 after the secondary transfer. In this way, the transfer unit 30 transfers (records) the toner images formed on the outer circumferential surface of the photosensitive drum 21 to the sheet S.

The fixing unit 6 is formed above the secondary transfer unit 33. The fixing unit 6 heats and pressurizes the sheet S to which the toner images have been transferred, and thereby fixes the toner images on the sheet S.

The sheet ejection unit 7 is arranged above the transfer unit 30. The sheet S in which the toner images have been fixed and printing has been completed is conveyed to the sheet ejection unit 7. In the sheet ejection unit 7, the sheet (printed item) after printing is taken out from above.

The control unit 8 includes a CPU, an image processing unit and other electronic circuits and electronic components (all of which are not shown). The CPU controls, based on control programs and data stored in the storage unit 9, the operations of constituent elements provided in the image forming apparatus 1, and performs processing related to the functions of the image forming apparatus 1. Each of the sheet supply unit 3, the sheet conveyance unit 4, the exposure unit 5, the image formation unit 20, the transfer unit 30 and the fixing unit 6 individually receives a command from the control unit 8 to perform printing on the sheet S in a coordinated manner.

The storage unit 9 is formed with, for example, a combination of involatile storage devices (not shown) such as a program ROM (Read Only Memory) and a data ROM and a volatile storage device (not shown) such as a RAM (Random Access Memory).

As shown in FIG. 2, the image forming apparatus 1 further includes a voltage application unit 12 and a current detection unit 13.

The voltage application unit 12 includes, for example, a power supply unit and a control circuit (each of which is not shown). The voltage application unit 12 is electrically connected to the charge wire 221 and the grid electrode 222 of the charging unit 22, the development roller 234 of the development unit 23, the cleaning roller 242 of the drum cleaning unit 24 and the primary transfer roller 321 and the secondary transfer roller 331 of the transfer unit 30. The voltage application unit 12 applies predetermined voltages to the charging unit 22, the development unit 23, the cleaning roller 242 and the transfer unit 30.

Specifically the voltage application unit 12 applies a charging current to the charge wire 221 and a charging voltage to the grid electrode 222, applies a development voltage (development bias) to the development roller 234, applies a collection voltage (cleaning bias) to the cleaning roller 242 and applies a transfer voltage (transfer current) to the primary transfer roller 321 and the secondary transfer roller 331. The control unit 8 controls, via the voltage application unit 12, the timing of application of the voltages (currents) to the charge wire 221, the grid electrode 222, the development roller 234, the cleaning roller 242, the primary transfer roller 321 and the secondary transfer roller 331, the voltage values (current values) thereof, the polarities thereof, application times and the like.

The current detection unit 13 detects, when the voltage application unit 12 applies the collection voltage to the cleaning roller 242, a current (drum inflow current) flowing between the photosensitive drum 21 and the cleaning roller 242. The control unit 8 receives, from the current detection unit 13, information related to the current detected by the current detection unit 13.

The configuration of the image formation unit 20 and an area therearound will then be described with reference to FIG. 3. Since the image formation units 20 of the individual colors basically have the same configuration, unless otherwise it is necessary to provide a particular limitation, identification symbols for representing the colors of the constituent elements and the description thereof are omitted.

The image formation unit 20 includes the photosensitive drum 21, the charging unit 22, the development unit 23 and the drum cleaning unit 24.

The photosensitive drum 21 is in the shape of a cylinder which is supported to be able to rotate parallel to a center axis line, and is rotated at a constant speed around the center axis line by a drive unit (not shown). The photosensitive drum 21 has the photosensitive layer formed with, for example, an organic photoconductor (OPC) on the outer circumferential surface of a drum tube made of a metal such as aluminum. On the outer circumferential surface of the photosensitive drum 21, the electrostatic latent image is formed.

The charging unit 22 is arranged opposite the outer circumferential surface of the photosensitive drum 21 with a predetermined distance therebetween. The charging unit 22 includes the charge wire 221 and the grid electrode 222. The charge wire 221 is a linear electrode which extends parallel to the axial direction of the photosensitive drum 21, and generates corona discharge between the photosensitive drum 21 and the charge wire 221. The grid electrode 222 is a grid electrode which extends in the axial direction of the photosensitive drum 21, and is arranged between the charge wire 221 and the photosensitive drum 21. In the charging unit 22, the predetermined charging current is applied to the charge wire 221 to generate the corona discharge, and the predetermined charging voltage is further applied to the grid electrode 222 to uniformly charge the outer circumferential surface (surface) of the photosensitive drum 21 to the predetermined surface potential.

The development unit 23 is arranged on the downstream side of the charging unit 22 in the direction of rotation of the photosensitive drum 21. The development unit 23 includes a development container 231, a stirring paddle 232, a supply roller 233 and the development roller 234.

The development container 231 is in an elongated shape which extends along the axial direction (the depth direction of the plane of FIG. 3) of the photosensitive drum 21, and is arranged with its longitudinal direction horizontal. The development container 231 includes an opening 231*a* in a part thereof opposite the photosensitive drum 21. The development container 231 stores the non-magnetic one-component toner as a developer. In other words, the development container 231 stores the toner which is supplied to the photosensitive drum 21.

The stirring paddle 232 is arranged in the position of an upper portion within the development container 231 which is separate from the opening 231*a* through the development roller 234 and the supply roller 233. The stirring paddle 232 is supported by the development container 231 to be able to rotate around an axis line which is extended parallel to the photosensitive drum 21. The stirring paddle 232 further includes a flexible film portion which is extended in a radius direction. The stirring paddle 232 is rotated around the axis line to stir the toner in the development container 231.

The supply roller 233 is arranged in the position of a lower portion within the development container 231 which is between the opening 231*a* and the stirring paddle 232. The supply roller 233 is arranged opposite the development roller 234. The supply roller 233 is supported by the development container 231 to be able to rotate around an axis line which is extended parallel to the photosensitive drum 21. The supply roller 233 carries, in a region opposite the development roller 234, the toner supplied to the outer circumferential surface of the development roller 234. The supply roller 233 is rotated in the same direction as the development roller 234.

The development roller 234 is arranged in the opening 231*a* of the development container 231, and a part thereof is exposed from the development container 231. The development roller 234 is arranged opposite the photosensitive drum 21, and is in contact with the photosensitive drum 21. The development roller 234 is supported by the development container 231 to be able to rotate around an axis line which is extended parallel to the axis line of the photosensitive drum 21. The development roller 234 carries, in a region opposite the photosensitive drum 21, the toner supplied to the outer circumferential surface of the photosensitive drum 21. The development roller 234 is rotated in a direction opposite to the photosensitive drum 21. The development roller 234 supplies the toner in the development container 231 to the outer circumferential surface of the photosensitive drum 21, and develops the electrostatic latent image to form the toner image.

The drum cleaning unit 24 is arranged on the downstream side of the primary transfer unit 32 in the direction of rotation of the photosensitive drum 21. The drum cleaning unit 24 includes a collection container 241 and the cleaning roller 242.

The collection container 241 is in an elongated shape which extends along the axial direction (the depth direction of the plane of FIG. 3) of the photosensitive drum 21, and is arranged with its longitudinal direction horizontal. The collection container 241 stores the substance adhered such as the toner which is removed by the cleaning roller 242 from the outer circumferential surface of the photosensitive drum 21 and is collected.

The cleaning roller 242 is arranged opposite the photosensitive drum 21 with a part thereof exposed from the collection container 241. The cleaning roller 242 is supported by the collection container 241 to be able to rotate around an axis line which is extended parallel to the axis line of the photosensitive drum 21. The cleaning roller 242 is formed with, for example, a sponge roller having a predetermined cell diameter. The cleaning roller 242 is in contact with the outer circumferential surface of the photosensitive drum 21 at a predetermined pressure. When an image is formed, the voltage application unit 12 applies the collection voltage to the cleaning roller 242. The cleaning roller 242 removes and collects the substance adhered including the toner which is left on the outer circumferential surface of the photosensitive drum 21 after the primary transfer.

The cleaning roller 242 collects the toner in the cells of a sponge. When the cumulative driving time of the drum cleaning unit 24 is prolonged, the toner is stored in the cells, and thus it is difficult for the cleaning roller 242 to collect the transfer residual toner. Collection performance for the transfer residual toner by the cleaning roller 242 can be enhanced by appropriately adjusting the collection voltage (cleaning bias) to the cleaning roller 242.

The collection of the transfer residual toner performed by the cleaning roller 242 will then be described in detail.

Figure 4:
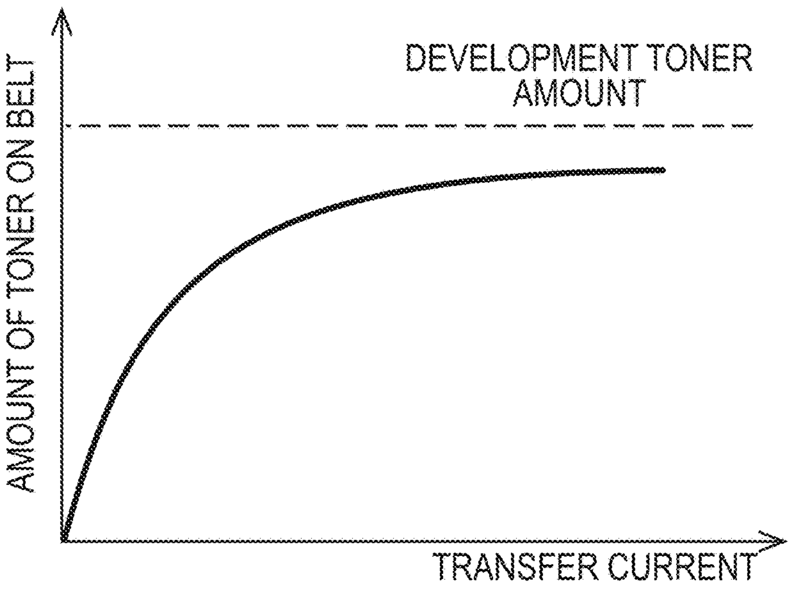
FIG. 4 is a graph showing a relationship between a transfer current to an intermediate transfer belt and the amount of toner on the belt.

FIG. 4 is a graph showing a relationship between the transfer current to the intermediate transfer belt 31 and the amount of toner on the belt. In the graph shown in FIG. 4, the horizontal axis represents the transfer current applied to the primary transfer roller 321, and the vertical axis represents the amount of toner on the belt which is primarily transferred from the photosensitive drum 21 to the intermediate transfer belt 31 for the transfer current. The amount of toner on the belt is estimated based on the magnitude of the toner density of the toner image transferred to the outer circumferential surface of the intermediate transfer belt 31 which is detected with a density detection unit (not shown). As shown in the curve of FIG. 4, it is found that as the transfer current is increased, the amount of toner on the belt is increased.

A dotted line shown in FIG. 4 indicates a development toner amount which is supplied from the development unit 23 to the photosensitive drum 21 in the formation of the toner image. The development toner amount is predicted from the amount of toner on the belt in the toner image transferred to the outer circumferential surface of the intermediate transfer belt 31 by utilization of a prediction table (not shown) which is previously stored in the storage unit 9 and the like.

The amount of transfer residual toner is calculated based on a difference between the development toner amount predicted by utilization of the prediction table and the like and the amount of toner on the belt. The transfer residual toner is a toner which is supplied from the development unit 23 to the photosensitive drum 21 but is not transferred to the outer circumferential surface of the intermediate transfer belt 31 during the primary transfer to be left on the photosensitive drum 21.

In FIG. 4, a difference between the development toner amount indicated by the dotted line and the amount of toner on the belt indicated by the curve is the amount of transfer residual toner. In other words, as the transfer current is lowered, the amount of transfer residual toner is increased, and thus it may be difficult for the cleaning roller 242 to collect the transfer residual toner.

Figure 5:
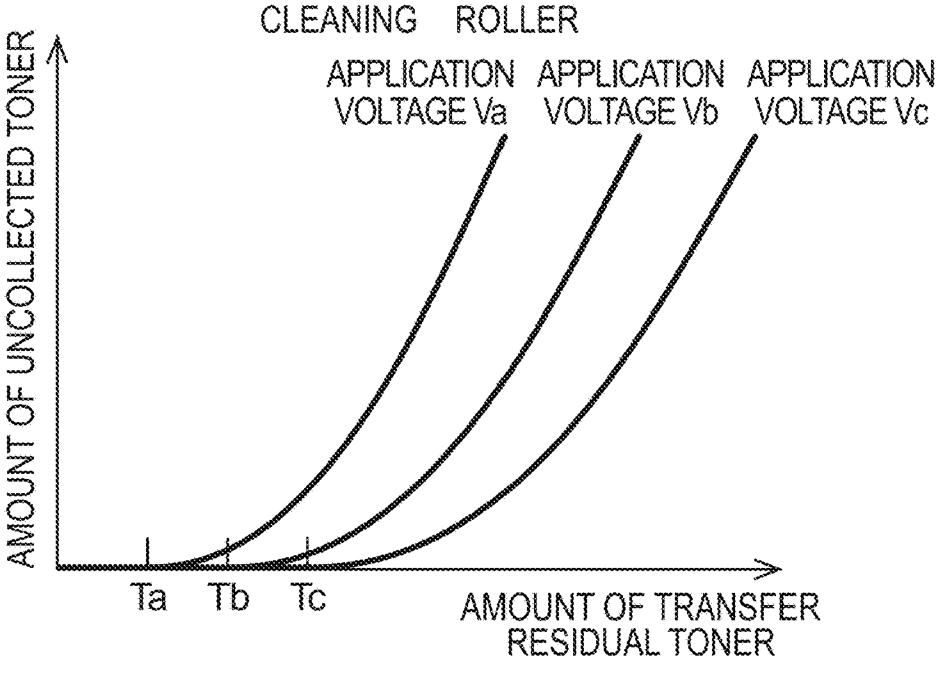
FIG. 5 is a graph showing a relationship between the amount of transfer residual toner on a photosensitive drum and the amount of uncollected toner.

FIG. 5 is a graph showing a relationship between the amount of transfer residual toner on the photosensitive drum 21 and the amount of uncollected toner. In the graph shown in FIG. 5, the horizontal axis represents the amount of transfer residual toner in a reference image (not shown) left on the photosensitive drum 21, and the vertical axis represents, with respect to the amount of transfer residual toner, the amount of uncollected toner in the reference image transferred to the intermediate transfer belt 31 which is not collected by the cleaning roller 242 and the development unit 23 to be left even after one revolution of the photosensitive drum 21.

When the relationship between the amount of transfer residual toner and the amount of uncollected toner is checked, the reference image which is a toner image is formed on the photosensitive drum 21. Then, the transfer current is changed, and thus in the reference image, the amount of transfer residual toner left on the photosensitive drum 21 after the primary transfer is increased or decreased, and the amount of uncollected toner is further increased or decreased.

FIG. 5 shows a result obtained by changing an application voltage (collection voltage) to the cleaning roller 242 to Va, Vb and Ve in a stepwise manner, and measuring the amount of uncollected toner with respect to the amount of transfer residual toner. As shown in FIG. 5, when the amount of transfer residual toner (horizontal axis) is small, the transfer residual toner is collected by the cleaning roller 242 and the development unit 23, and thus the amount of uncollected toner (vertical axis) is zero. As the amount of transfer residual toner is increased, the amount of uncollected toner is gradually increased, with the result that the curve shown in FIG. 5 is drawn.

A collectable toner amount for the application voltage (collection voltage) to the cleaning roller 242 is measured based on the amount of uncollected toner. Specifically, in FIG. 5, a collectable toner amount Ta for the application voltage Va to the cleaning roller 242, a collectable toner amount Tb for the application voltage Vb and a collectable toner amount Tc for the application voltage Ve are measured based on the amount of uncollected toner. In FIG. 5, as the application voltage to the cleaning roller 242 is increased, that is, in the order of application voltages Va<Vb<Vc, the amount of collectable transfer residual toner, that is, the collectable toner amount is increased (Ta<Tb<Tc).

Figure 6:
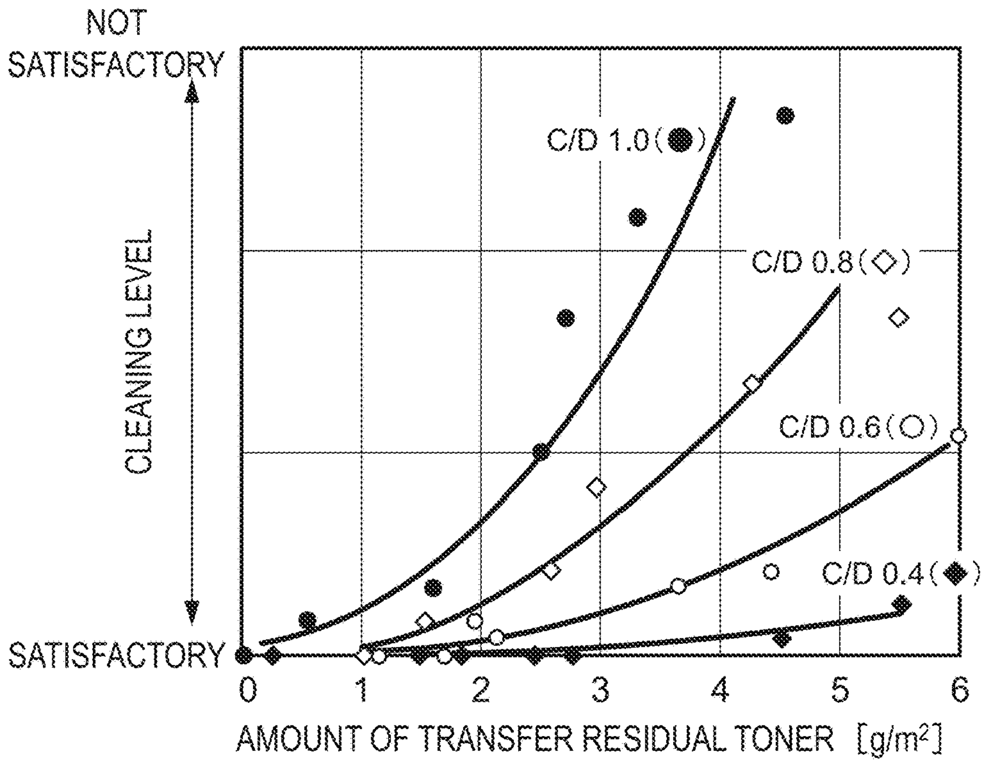
FIG. 6 is a graph showing a relationship between the amount of transfer residual toner on the photosensitive drum and a cleaning level.

FIG. 6 is a graph showing a relationship between the amount of transfer residual toner on the photosensitive drum 21 and a cleaning level. In the graph shown in FIG. 6, the horizontal axis represents the amount of transfer residual toner left on the photosensitive drum 21, and the vertical axis represents the cleaning level for the transfer residual toner. The cleaning level shown in the vertical axis indicates the degree of the collection of the transfer residual toner performed by the cleaning roller 242, and as the vertical axis of the cleaning level extends upward, the cleaning level is degraded. The “C/D” in FIG. 6 represents a “rotation speed ratio”, and the rotation speed ratio is indicated by “cleaning roller rotation speed (C)/photosensitive drum rotation speed (D)”.

FIG. 6 shows a result obtained by changing the rotation speed ratio (C/D) of the cleaning roller 242 to the photosensitive drum 21 to 1.0, 0.8, 0.6 and 0.4 in a stepwise manner, and evaluating the cleaning level for the transfer residual toner. As shown in FIG. 6, when the amount of transfer residual toner (horizontal axis) is small, the transfer residual toner is collected by the cleaning roller 242, and thus the amount of uncollected toner is zero, with the result that the cleaning level is satisfactory (lower end of the vertical axis). As the amount of transfer residual toner is increased, the amount of uncollected toner is gradually increased, and thus the cleaning level is degraded, with the result that the curve shown in FIG. 6 is drawn.

When only a small amount of uncollected toner is generated by the cleaning roller 242, a collection failure occurs. In other words, when the cleaning level is even slightly degraded from the state where the cleaning level is satisfactory (lower end of the vertical axis), the collection failure is assumed to occur. In this way, in each rotation speed ratio (C/D), when the cleaning level is satisfactory (lower end of the vertical axis), a range from zero to the maximum value in the transfer residual toner is a settable range.

Specifically, in FIG. 6, when rotation speed ratio (C/D) =0.8, the amount of collectable transfer residual toner is about 1.0 $g/m^2$, and when rotation speed ratio (C/D)=0.6, the amount of collectable transfer residual toner is about 1.7 $g/m^2$. In FIG. 6, as the rotation speed ratio (C/D) of the cleaning roller 242 to the photosensitive drum 21 is decreased, that is, in the order of rotation speed ratios (C/D) 1.0<0.8<0.6<0.4, the amount of collectable transfer residual toner is increased, with the result that the settable range of the rotation speed ratio is extended.

Figure 7:
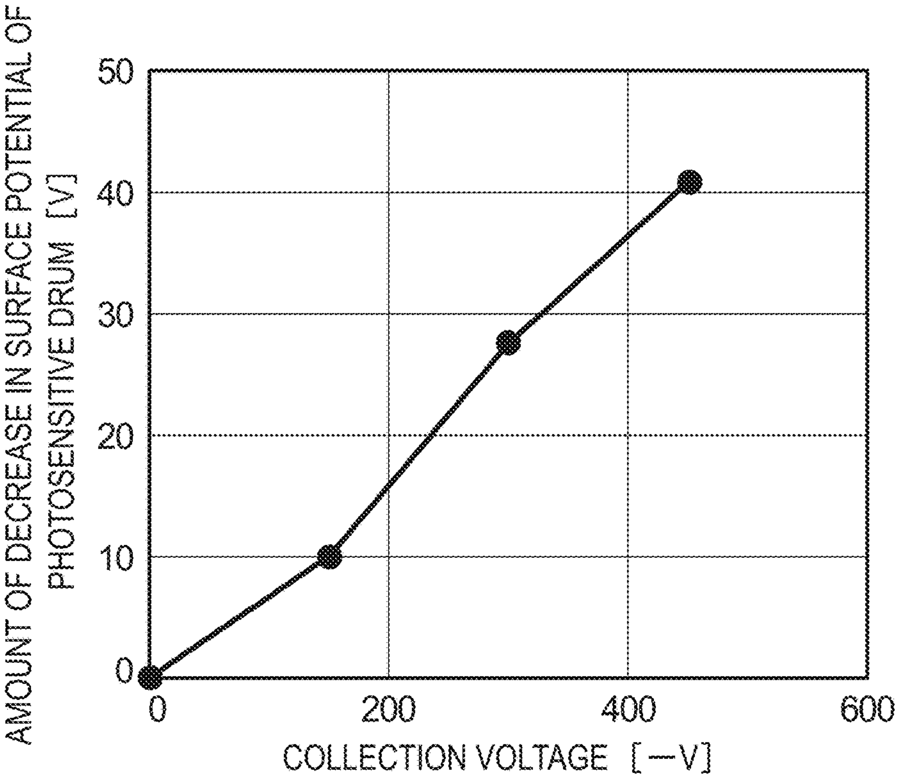
FIG. 7 is a graph showing a relationship between a collection voltage to a cleaning roller and the amount of decrease in the surface potential of the photosensitive drum.

FIG. 7 is a graph showing a relationship between the collection voltage to the cleaning roller 242 and the amount of decrease in the surface potential of the photosensitive drum 21. In the graph shown in FIG. 7, the horizontal axis represents the collection voltage applied to the cleaning roller 242, and the vertical axis represents the amount of decrease in the surface potential of the photosensitive drum 21.

The photosensitive drum 21 is positively charged, and the cleaning roller 242 is negatively charged. In this way, as shown in FIG. 7, as the absolute value of the collection voltage to the cleaning roller 242 is increased, the amount of decrease in the surface potential of the photosensitive drum 21 is increased. When the collection voltage is applied, the control unit 8 estimates the surface potential of the photosensitive drum 21 based on a current flowing between the photosensitive drum 21 and the cleaning roller 242 which is detected by the current detection unit 13.

As shown in FIG. 5, as the application voltage (collection voltage) to the cleaning roller 242 is increased, the amount of collectable transfer residual toner is increased. In other words, the collection performance for the transfer residual toner on the photosensitive drum 21 is enhanced. However, when the collection voltage to the cleaning roller 242 is increased, as shown in FIG. 7, the amount of decrease in the surface potential of the photosensitive drum 21 is increased.

In the drum cleaning unit 24, an electric field is generated by a potential difference between the surface potential of the photosensitive drum 21 and the collection voltage applied to the cleaning roller 242, and by the action of the electric field, the transfer residual toner on the photosensitive drum 21 is moved onto the cleaning roller 242 and is collected. As the amount of decrease in the surface potential of the photosensitive drum 21 is increased, the potential difference between the surface potential of the photosensitive drum 21 and the collection voltage to the cleaning roller 242 is decreased, with the result that a failure may occur in which unintended toner is adhered to a white portion (a background portion and a ground portion) of a recording sheet. The range of the collection voltage to the cleaning roller 242 for the maximum amount of decrease in the surface potential of the photosensitive drum 21 in which the image failure as described above does not occur is the settable range of the collection voltage applied to the cleaning roller 242.

Figure 8:
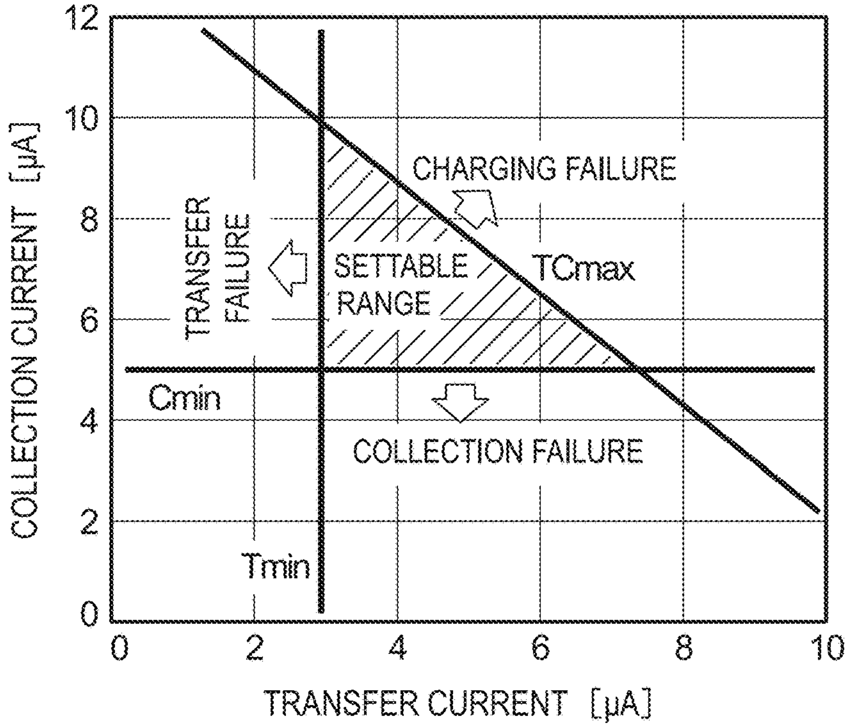
FIG. 8 is a graph showing the settable range of the transfer current and a collection current.

FIG. 8 is a graph showing the settable range of the transfer current and a collection current. In the graph shown in FIG. 8, the horizontal axis represents the transfer current [μA] applied to the primary transfer roller 321, and the vertical axis represents the collection current [μA] applied to the cleaning roller 242.

In FIG. 8, when the collection current to the cleaning roller 242 is decreased, the collection performance for the transfer residual toner on the photosensitive drum 21 is lowered, and thus the “collection failure” occurs. Hence, the minimum value Cmin of the collection current to the cleaning roller 242 for the settable range is determined. In FIG. 8, the minimum value Cmin of the collection current is extended linearly in a lateral direction, and when the collection current is lower than the minimum value Cmin, the collection failure occurs.

When the transfer current to the primary transfer roller 321 is decreased, transfer performance for the toner image formed on the photosensitive drum 21 to the intermediate transfer belt 31 is lowered, and thus a transfer failure occurs. Hence, the minimum value Tmin of the transfer current to the primary transfer roller 321 for the settable range is determined. In FIG. 8, the minimum value Tmin of the transfer current is extended linearly in a vertical direction, and when the transfer current is lower than the minimum value Tmin, the transfer failure occurs.

When the collection current to the cleaning roller 242 and the transfer current to the primary transfer roller 321 are increased, a charging failure in the photosensitive drum 21 occurs. Hence, the maximum value TCmax of the collection current to the cleaning roller 242 and the transfer current to the primary transfer roller 321 for the settable range is determined. In FIG. 8, the maximum value TCmax of the collection current and the transfer current is extended linearly in an oblique direction, and when a combination of the collection current and the transfer current is higher than the maximum value TCmax, the charging failure occurs.

A hatched region which is determined in this way, is surrounded by the three straight lines Cmin, Tmin and TCmax and is shown in FIG. 8 is the settable range of the transfer current and the collection current.

As described previously, when an image is formed, the control unit 8 applies, with the voltage application unit 12, the collection voltage to the cleaning roller 242. In this way, it is possible to remove and collect the substance adhered (transfer residual toner) such as the toner which is left on the outer circumferential surface of the photosensitive drum 21 after the primary transfer. As the collection voltage applied to the cleaning roller 242 is increased, the amount of collectable transfer residual toner is increased, and thus the collection performance for the transfer residual toner on the photosensitive drum 21 is enhanced.

On the other hand, the control unit 8 estimates, when the collection voltage is applied, the surface potential of the photosensitive drum 21 based on the current (drum inflow current) flowing between the photosensitive drum 21 and the cleaning roller 242 which is detected by the current detection unit 13. In this way, the control unit 8 determines whether the surface potential of the photosensitive drum 21 is lowered. A decrease in the surface potential of the photosensitive drum 21 is detected, and thus it is possible to recognize a decrease in the collection performance for the transfer residual toner which is not transferred to be left on the photosensitive drum 21.

Then, the control unit 8 recognizes, based on a decrease in the surface potential of the photosensitive drum 21 when the collection voltage is applied, that the collection voltage is excessively high to exceed the settable range of the transfer current and the collection current shown in FIG. 8. On the other hand, the control unit 8 performs control which adjusts collection conditions for the cleaning roller 242 with respect to the transfer residual toner on the photosensitive drum 21.

EXAMPLE

The adjustment of the collection conditions for the cleaning roller 242 with respect to the transfer residual toner on the photosensitive drum 21 and the evaluation thereof will then be described. Control conditions for the image forming apparatus related to the adjustment and the evaluation are shown in Table 1.

In Table 1, in the image forming apparatus of Comparative Example 1, the rotation speed ratio of the cleaning roller to the photoconductive drum is 0.8, the collection current is 10 μA and the drum inflow current is 50 μA. In Comparative Example 1, the collection current is high, thus the collectability of the transfer residual toner is satisfactory but the charged state is not satisfactory, with the result that fogging occurs.

In the image forming apparatus of Comparative Example 2, the rotation speed ratio of the cleaning roller to the photoconductive drum is 0.8, the collection current is 5 μA and the drum inflow current is 40 μA. In Comparative Example 2, the collection current is lower than in Comparative Example 1, thus the charged state is satisfactory, thereby the occurrence of fogging is suppressed, but the collectability of the transfer residual toner is not satisfactory, with the result that uncollected toner is generated.

By contrast, in the image forming apparatus 1 in Example of the present disclosure, the rotation speed ratio of the cleaning roller 242 to the photoconductive drum 21 is 0.6, the collection current is 5 μA and the drum inflow current is 40 μA. In Example, the collection current is lower than in Comparative Example 1, and the rotation speed ratio of the cleaning roller 242 to the photoconductive drum 21 is lower than in Comparative Example 2. In this way, in Example, both the charged state and the collectability of the transfer residual toner are satisfactory, and thus the occurrence of fogging and uncollected toner are suppressed.

Figure 9:
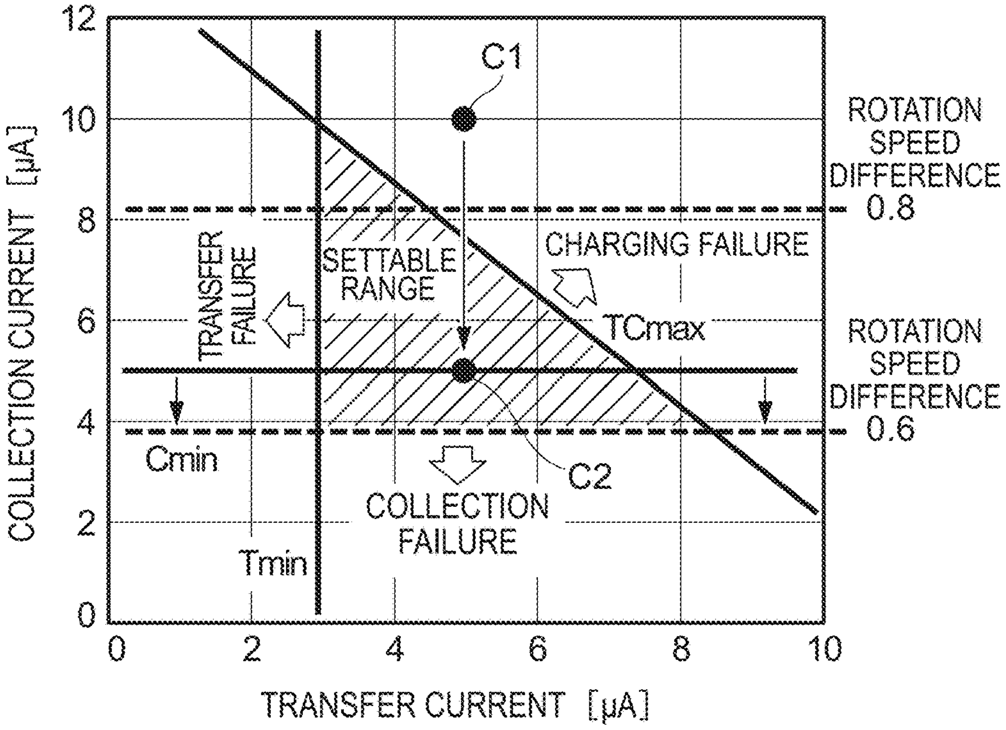
FIG. 9 is an illustrative diagram showing control for setting out-of-range conditions within the settable range of the transfer current and the collection current shown in the graph of FIG. 8.

FIG. 9 is an illustrative diagram showing control for setting out-of-range conditions within the settable range of the transfer current and the collection current shown in the graph of FIG. 8. In the graph shown in FIG. 9, the horizontal

TABLE 1

| | Installation environment | Rotation speed ratio | Collection current [μA] | Drum inflow current [μA] | Fogging | Collectability |
|---|---|---|---|---|---|---|
| Comparative Example 1 | Low temperature/ low humidity | 0.8 | 10 | 50 | Fogging occurred | Satisfactory |
| Comparative Example 2 | Low temperature/ low humidity | 0.8 | 5 | 40 | No fogging | Not satisfactory |
| Example | Low temperature/ low humidity | 0.6 | 5 | 40 | No fogging | Satisfactory |

As shown in Table 1, the control conditions are different between the image forming apparatus 1 in Example of the present disclosure and the image forming apparatuses in Comparative Examples 1 and 2. The apparatuses each are installed in a low-temperature, low-humidity environment. The "rotation speed ratio" is indicated by "cleaning roller rotation speed/photosensitive drum rotation speed". The "fogging" is a failure in which unintended toner is adhered to a white portion (a background portion and a ground portion) of a recording sheet. The other conditions are that the photosensitive drum includes a photosensitive layer formed of an organic photoconductor (OPC), the diameter of the photosensitive drum is 24 mm and the circumferential speed thereof is 120 mm/s. The diameter of the cleaning roller is 11 mm. The transfer current is 5 μA.

axis represents the transfer current [u A] applied to the primary transfer roller 321, and the vertical axis represents the collection current [u A] applied to the cleaning roller 242.

Conditions C1 in FIG. 9 correspond to the control conditions in Comparative Example 1 in Table 1. As shown in FIG. 9, in the conditions C1 corresponding to Comparative Example 1 in Table 1, the charging failure (fogging) occurs.

Conditions C2 in FIG. 9 correspond to the control conditions in Comparative Example 2 in Table 1. As shown in FIG. 9, in the conditions C2 corresponding to Comparative Example 2 in Table 1, the collection failure (uncollected toner) occurs.

By contrast, in Example of the present disclosure, the collection current is lowered relative to Comparative Example 1 (Conditions C1) to be substantially equal to that in Comparative Example 2 (Conditions C2), and furthermore, the rotation speed ratio of the cleaning roller 242 to the photoconductive drum 21 is decreased from 0.8 to 0.6 relative to Comparative Example 2 (see Table 1), that is, a rotation speed difference between the photosensitive drum 21 and the cleaning roller 242 is increased. In this way, as shown in FIG. 9, the minimum value Cmin of the collection current can be lowered, and thus the settable range for the collection current can be extended to the lower side. Consequently, the collection conditions for the cleaning roller 242 can be within the settable range.

As described above, when the surface potential of the photosensitive drum 21 is lowered, the control unit 8 changes the collection voltage applied to the cleaning roller 242 and the rotation speed of the cleaning roller 242. The collection voltage to the cleaning roller 242 is changed, the rotation speed of the cleaning roller 242 is changed and thus the rotation speed difference between the photosensitive drum 21 and the cleaning roller 242 is changed, with the result that the collection performance for the transfer residual toner on the photosensitive drum 21 can be enhanced. In this way, it is possible to appropriately collect the transfer residual toner on the photosensitive drum 21.

Specifically, when the surface potential of the photosensitive drum 21 is lowered, the control unit 8 lowers the collection voltage applied to the cleaning roller 242, and increases the rotation speed difference between the photosensitive drum 21 and the cleaning roller 242 (decreases the rotation speed ratio).

In this configuration, the collection voltage is lowered, and thus it is possible to suppress the occurrence of the charging failure (fogging). On the other hand, the collection voltage is lowered, and thus the collection failure (uncollected toner) may occur. However, the rotation speed difference between the photosensitive drum 21 and the cleaning roller 242 is increased, and thus the collection conditions for the cleaning roller 242 can be within the settable range. In this way, it is possible to appropriately collect the transfer residual toner on the photosensitive drum 21.

The drum inflow current includes not only the current which flows from the cleaning roller 242 into the photosensitive drum 21 but also the transfer current. When the transfer current is high, it is likely that a minute current flowing from the cleaning roller 242 into the photosensitive drum 21 cannot be detected accurately.

Hence, when the current (drum inflow current) flowing between the photosensitive drum 21 and the cleaning roller 242 is detected at the time of application of the collection voltage to the cleaning roller 242, if it is difficult to separate the current from the transfer current, the application of the transfer voltage to the primary transfer roller 321 is turned off. In other words, the control unit 8 applies the collection voltage to the cleaning roller 242 in a state where the voltage application unit 12 does not apply the transfer voltage to the transfer unit 30, and estimates the surface potential of the photosensitive drum 21 based on the current (drum inflow current) flowing between the photosensitive drum 21 and the cleaning roller 242 which is detected by the current detection unit 13.

In this configuration, when the collection voltage is applied, it is possible to suppress a problem in which the result of the detection performed by the current detection unit 13 is affected by the transfer voltage (transfer current). In this way, it is possible to suitably determine timing at which the surface potential of the photosensitive drum 21 is lowered. Hence, with suitable timing for a decrease in the surface potential of the photosensitive drum 21, the collection voltage to the cleaning roller 242 and the rotation speed thereof can be changed.

The control unit 8 changes the magnitudes of the collection voltage to the cleaning roller 242 and the rotation speed thereof according to the magnitude of the current (drum inflow current) flowing between the photosensitive drum 21 and the cleaning roller 242 which is detected by the current detection unit 13 when the surface potential of the photosensitive drum 21 is lowered.

For example, since the charging failure may occur when the collection voltage to the cleaning roller 242 is excessively high, the control unit 8 lowers, according to the magnitude of the drum inflow current, the excessively high collection voltage to the cleaning roller 242 to an appropriate voltage value. When the collection voltage to the cleaning roller 242 is lowered, the collection performance for the transfer residual toner on the photosensitive drum 21 is lowered accordingly. Hence, the control unit 8 performs control for decreasing the rotation speed ratio of the cleaning roller 242 to the photosensitive drum 21 to enhance the collection performance for the transfer residual toner.

In this configuration, the magnitudes of the collection voltage to the cleaning roller 242 and the rotation speed thereof can be set according to the degree of a decrease in the surface potential of the photosensitive drum 21. The collection voltage to the cleaning roller 242 and the rotation speed thereof can be stepwise changed according to the degree of a decrease in the surface potential of the photosensitive drum 21. In other words, when the surface potential of the photosensitive drum 21 is lowered, it is possible to adjust the collection conditions for the cleaning roller 242 with respect to the transfer residual toner according to the state of the photosensitive drum 21 and the cleaning roller 242.

Furthermore, when the collectability of the transfer residual toner is significantly lowered, it is impossible to handle this problem by changing the collection voltage to the cleaning roller 242 and the rotation speed thereof. Hence, when both the collection voltage to the cleaning roller 242 and the rotation speed thereof which have been changed reach a predetermined upper limit value or a predetermined lower limit value, the control unit 8 may notify the user of information for prompting replacement of the cleaning roller 242 via the display unit 2*d*.

In this configuration, the user can prevent the generation of uncollected toner on the photosensitive drum 21. Hence, in the image forming apparatus 1, it is possible to suppress the occurrence of an image failure caused by uncollected toner, with the result that the user can continuously obtain a printed item in which high-quality image formation is performed.

In the case of an apparatus in which the cleaning roller 242 is formed integrally with the drum cleaning unit 24 or the image formation unit 20 such that each of them cannot be replaced individually, when the cleaning roller 242 is replaced, the user may be prompted to replace the drum cleaning unit 24 or the image formation unit 20.

Although the embodiment of the present disclosure has been described above, the scope of the present disclosure is not limited to the embodiment described above, and various changes can be made and implemented without departing from the spirit of the disclosure.

For example, although in the embodiment described above, the image forming apparatus 1 includes the intermediate transfer belt 31 to which the toner images formed by the four image formation units 20 are sequentially superimposed on each other and are transferred, the present disclosure is not limited to the embodiment described above. The present disclosure can also be applied to, for example, an image forming apparatus including a conveyance belt that conveys a sheet to which a toner image is transferred from a photosensitive drum.

Although in the embodiment described above, the image forming apparatus 1 is the image forming apparatus for the so-called tandem type color printer, the present disclosure is not limited to this type of apparatus. As long as the image forming apparatus includes the intermediate transfer belt, the image forming apparatus may be an image forming apparatus for a color printer of another system other than the tandem type.

What is claimed is:

1. An image forming apparatus comprising:

an image carrying member in which a photosensitive layer is formed on an outer circumferential surface;

a charging unit that charges the outer circumferential surface of the image carrying member to a predetermined surface potential;

an exposure unit that exposes the outer circumferential surface of the image carrying member charged by the charging unit to form an electrostatic latent image with attenuated charging;

a development unit that supplies a toner to the electrostatic latent image of the image carrying member to form a toner image;

a transfer unit that transfers the toner image formed on the outer circumferential surface of the image carrying member to a member to which the toner image is to be transferred;

a cleaning roller that removes and collects a substance adhered to the outer circumferential surface of the image carrying member;

a voltage application unit that applies a predetermined voltage to each of the charging unit, the development unit, the transfer unit and the cleaning roller;

a current detection unit that detects a current flowing between the image carrying member and the cleaning roller when the voltage application unit applies a collection voltage to the cleaning roller; and a control unit that controls the image carrying member, the charging unit, the development unit, the transfer unit, the cleaning roller and the voltage application unit, wherein the control unit applies, with the voltage application unit, the collection voltage to the cleaning roller when an image is formed, estimates a surface potential of the image carrying member based on the current detected by the current detection unit when the collection voltage is applied and changes the collection voltage and a rotation speed of the cleaning roller when the surface potential of the image carrying member is lowered.

2. The image forming apparatus according to claim 1, wherein when the surface potential of the image carrying member is lowered, the control unit lowers the collection voltage and increases a difference between a rotation speed of the image carrying member and the rotation speed of the cleaning roller.

3. The image forming apparatus according to claim 1, wherein the control unit applies the collection voltage to the cleaning roller in a state where the voltage application unit does not apply a transfer voltage to the transfer unit, and estimates the surface potential of the image carrying member based on the current detected by the current detection unit.

4. The image forming apparatus according to claim 1, wherein the control unit changes magnitudes of the collection voltage and the rotation speed according to a magnitude of the current detected by the current detection unit when the surface potential of the image carrying member is lowered.

5. The image forming apparatus according to claim 1, further comprising:

a notification unit that notifies a state of the image forming apparatus, wherein when both the collection voltage and the rotation speed that have been changed reach a predetermined upper limit value or a predetermined lower limit value, the control unit notifies information for prompting replacement of the cleaning roller via the notification unit.

* * * * *